(12) United States Patent
Sun

(10) Patent No.: US 11,387,548 B2
(45) Date of Patent: Jul. 12, 2022

(54) LIQUID CRYSTAL ANTENNA, METHOD OF DRIVING THE SAME, COMMUNICATION DEVICE

(71) Applicant: BOE Technology Group Co., Ltd., Beijing (CN)

(72) Inventor: Tuo Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 170 days.

(21) Appl. No.: 16/623,706

(22) PCT Filed: May 8, 2019

(86) PCT No.: PCT/CN2019/085986
§ 371 (c)(1),
(2) Date: Dec. 17, 2019

(87) PCT Pub. No.: WO2019/233235
PCT Pub. Date: Dec. 12, 2019

(65) Prior Publication Data
US 2020/0381810 A1 Dec. 3, 2020

(30) Foreign Application Priority Data
Jun. 8, 2018 (CN) .......................... 201810589385.8

(51) Int. Cl.
*H01Q 1/36* (2006.01)
*G02F 1/13* (2006.01)
(Continued)

(52) U.S. Cl.
CPC .......... *H01Q 1/36* (2013.01); *G02F 1/13306* (2013.01); *G02F 1/13452* (2013.01); *H01Q 1/50* (2013.01)

(58) Field of Classification Search
CPC .. H01Q 1/36; H01Q 1/50; H01Q 3/36; H01Q 3/46; H01Q 1/38; G02F 1/13306; G02F 1/13452; G09G 3/36
See application file for complete search history.

(56) References Cited

U.S. PATENT DOCUMENTS 10,153,550 B2 12/2018 Orui et al.
10,177,444 B2 * 1/2019 Nakazawa ............. H01Q 13/10
(Continued)

FOREIGN PATENT DOCUMENTS

CN 102033351 A * 4/2011
CN 104238220 A * 12/2014 ........... G02F 1/1368
(Continued)

OTHER PUBLICATIONS

First Office Action, including Search Report, for Chinese Patent Application No. 201810589385.8, dated Apr. 10, 2020, 12 pages.
(Continued)

*Primary Examiner* — Vibol Tan
(74) *Attorney, Agent, or Firm* — Westman, Champlin & Koehler, P.A.

(57) ABSTRACT

A liquid crystal antenna, a method of driving the same, and a communication device are provided. The liquid crystal antenna includes a first substrate and a second substrate opposite to each other; a liquid crystal layer between the first substrate and the second substrate; a first electrode on the first substrate and on a side of the first substrate facing the liquid crystal layer; a second electrode on the second substrate and on a side of the second substrate facing the liquid crystal layer, the second electrode being opposite to the first electrode; and a control circuit configured to output a first voltage signal to the first electrode and output a second
(Continued)

voltage signal to the second electrode, wherein the first voltage signal is opposite in polarity to the second voltage signal.

18 Claims, 3 Drawing Sheets

(51) Int. Cl.
*G02F 1/133* (2006.01)
*G02F 1/1345* (2006.01)
*H01Q 1/50* (2006.01)

(56) References Cited

U.S. PATENT DOCUMENTS

| | | | | |
|---|---|---|---|---|
| 10,446,939 | B2* | 10/2019 | Li | G02F 1/133382 |
| 10,892,551 | B2* | 1/2021 | Dong | H01Q 9/0407 |
| 11,011,854 | B2* | 5/2021 | Haziza | H01Q 9/0442 |
| 2010/0149142 | A1* | 6/2010 | Hsu | G09G 3/3648 |
| | | | | 345/205 |
| 2018/0026374 | A1 | 1/2018 | Chen et al. | |
| 2018/0031908 | A1* | 2/2018 | Xie | G02F 1/133514 |
| 2018/0138593 | A1 | 5/2018 | Nakazawa et al. | |
| 2018/0138594 | A1 | 5/2018 | Orui et al. | |
| 2018/0205156 | A1* | 7/2018 | Li | H01Q 9/0457 |
| 2018/0375202 | A1* | 12/2018 | Li | H01Q 9/0407 |
| 2019/0146248 | A1 | 5/2019 | Wang et al. | |

FOREIGN PATENT DOCUMENTS

| | | |
|---|---|---|
| CN | 106299627 A | 1/2017 |
| CN | 106932933 A | 7/2017 |
| CN | 206349494 U | 7/2017 |
| CN | 107408759 A | 11/2017 |
| CN | 107431275 A | 12/2017 |
| CN | 108803165 A | 11/2018 |

OTHER PUBLICATIONS

Second Office Action, including Search Report, for Chinese Patent Application No. 201810589385.8, dated May 25, 2020, 9 pages.

* cited by examiner

LIQUID CRYSTAL ANTENNA, METHOD OF DRIVING THE SAME, COMMUNICATION DEVICE

CROSS-REFERENCE TO RELATED APPLICATION

This application is a Section 371 National Stage Application of International Application No. PCT/CN2019/085986, filed on May 8, 2019, and claims the benefit of Chinese Patent Application No. 201810589385.8 filed on Jun. 8, 2018 in the National Intellectual Property Administration of China, the whole disclosure of which is incorporated herein by reference.

TECHNICAL FIELD

The present disclosure relates to the field of liquid crystal antenna technologies, and in particular, to a liquid crystal antenna, a method of driving the same, and a communication device.

BACKGROUND

At present, the liquid crystal antenna is driven by a DAC (Digital to Analog Converter) to provide an antenna voltage. As the number and size of antenna units increase, the number of DACs is further increased, and a large number of DACs take up a large space, further, a large amount of cost is incurred in developing a DAC driver board.

SUMMARY

Some embodiments of the present disclosure provide a liquid crystal antenna comprising: a first substrate and a second substrate opposite to each other; a liquid crystal layer between the first substrate and the second substrate; a first electrode on the first substrate and on a side of the first substrate facing the liquid crystal layer; a second electrode on the second substrate and on a side of the second substrate facing the liquid crystal layer, the second electrode being opposite to the first electrode; and a control circuit configured to output a first voltage signal to the first electrode and output a second voltage signal to the second electrode, wherein the first voltage signal is opposite in polarity to the second voltage signal.

In some embodiments, the first electrode and the second electrode synchronously receive the first voltage signal and the second voltage signal, respectively.

In some embodiments, the control circuit comprises an integrated circuit which is configured to implement one of a column inversion driving mode, a row inversion driving mode, and a dot inversion driving mode of a liquid crystal display device.

In some embodiments, the integrated circuit is configured to implement the column inversion driving mode of the liquid crystal display device, the first voltage signal and the second voltage signal are respectively outputted by a first signal output terminal and a second signal output terminal of the integrated circuit, the first signal output terminal and the second signal output terminal being configured to output adjacent column data signals.

In some embodiments, the control circuit comprises a first integrated circuit and a second integrated circuit, each of which is configured to drive a liquid crystal display device.

In some embodiments, the first voltage signal is outputted by a first signal output terminal of the first integrated circuit, and the second voltage signal is outputted by a second signal output terminal of the second integrated circuit.

In some embodiments, The liquid crystal antenna further comprising: a timing controller configured to enable the first signal output terminal of the first integrated circuit and the second signal output terminal of the second integrated circuit to synchronously output the first voltage signal and the second voltage signal, respectively.

In some embodiments, an absolute value of the first voltage signal is equal to an absolute value of the second voltage signal.

In some embodiments, an orthographic projection of the first electrode on the first substrate has a coil shape, and an orthographic projection of the second electrode on the first substrate has a block shape.

In some embodiments, the orthographic projection of the first electrode on the first substrate falls within the orthographic projection of the second electrode on the first substrate.

In some embodiments, the first electrode and the second electrode constitute an antenna unit, and the liquid crystal antenna comprises a plurality of antenna units arranged in an array.

In some embodiments, the first voltage signal outputted in one of two adjacent frames is opposite in polarity to the first voltage signal outputted in the other of the two adjacent frames, and the second voltage signals outputted in the one of the two adjacent frames is opposite in polarity to the second voltage signals outputted in the other of the two adjacent frames.

In some embodiments, the control circuit is located at an edge region of the first substrate or an edge region of the second substrate.

In some embodiments, the liquid crystal antenna further comprising a printed circuit board connected to the first substrate or the second substrate, wherein the control circuit is disposed on the printed circuit board.

In some embodiments, the first integrated circuit is located at an edge region of the first substrate, and the second integrated circuit is located at an edge region of the second substrate.

In some embodiments, the liquid crystal antenna further comprising: a first signal line, through which the first electrode receives the first electrode signal; and a second signal line, through which the second electrode receives the second electrode signal.

Some embodiments of the present disclosure provide a communication device comprising the liquid crystal antenna according to above embodiments.

Some embodiments of the present disclosure provide a method of driving a liquid crystal antenna, the liquid crystal antenna comprising: a first substrate and a second substrate opposite to each other; a liquid crystal layer between the first substrate and the second substrate; a first electrode on the first substrate and on a side of the first substrate facing the liquid crystal layer; a second electrode on the second substrate and on a side of the second substrate facing the liquid crystal layer, the second electrode being opposite to the first electrode; and a control circuit configured to output a first voltage signal to the first electrode and output a second voltage signal to the second electrode, wherein the method comprises: determining the first voltage signal and the second voltage signal based on a required driving voltage between the first electrode and the second electrode, the first voltage signal being opposite in polarity to the second voltage signal; and transmitting the first voltage signal and the second voltage signal to the first electrode and the second electrode, respectively.

In some embodiments, determining the first voltage signal and the second voltage signal based on the required driving voltage between the first electrode and the second electrode comprises: determining that each of an absolute value of the first voltage signal and an absolute value of the second voltage signal is equal to a half of an absolute value of the required driving voltage.

In some embodiments, the first voltage signal and the second voltage signal are synchronously outputted.

DETAILED DESCRIPTION OF THE EMBODIMENTS

Figure 1A:
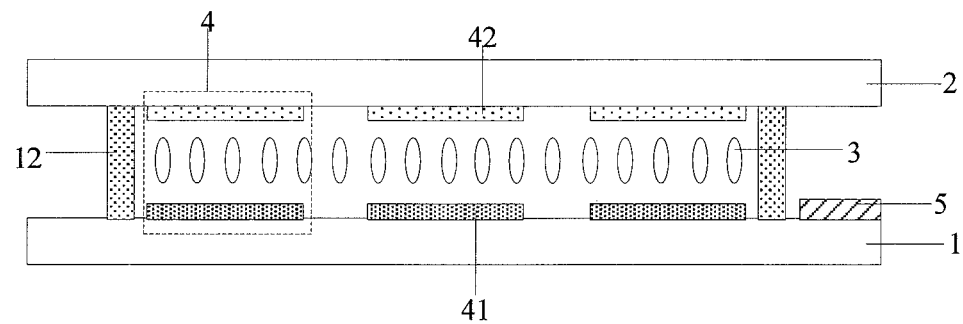
FIG. 1A is a schematic cross-sectional view of a liquid crystal antenna according to some embodiments of the present disclosure.

In order to make the above objects, features and advantages of the present disclosure more apparent and understandable, the present disclosure will be further described below in conjunction with the accompanying drawings and embodiments. However, exemplary embodiments may be implemented in various forms and should not be construed as being limited to the embodiments set forth herein can be embodied in a variety of forms and should not be construed as being limited to the embodiments set forth herein; rather, these embodiments are provided to make the present disclosure more comprehensive and complete, and to fully convey the concept of the example embodiments to those skilled in the art. The same reference numerals in the drawings denote the same or similar structures, and a repetitive description thereof will be omitted. The words expressing the position and the orientation in the present disclosure are described by taking the drawings as an example. Modifications may be made as needed, and the modifications are included in the scope of the present disclosure. The drawings of the present disclosure are only used to illustrate the relative positional relationship, and layer thicknesses of some portions are drawn in an exaggerated manner for ease of understanding, and the layer thicknesses in the drawings do not represent the proportional relationship of actual layer thicknesses.

It should be noted that specific details are set forth in the following description in order to fully understand the present disclosure. However, the present disclosure may be implemented in various other ways than those described herein, and those skilled in the art may make similar extensions without departing from the meaning of the disclosure. Therefore the present disclosure is not limited by the specific embodiments disclosed below. Certain terms used throughout the specification and claims refer to particular components. Those skilled in the art will appreciate that hardware manufacturers may refer to the same component by different nouns. The present specification and the claims do not use the difference in the name as the means for distinguishing the components, but the difference in function of the components as the criterion for distinguishing. The word "comprising" as used throughout the specification and claims is an open term and should be interpreted as "including but not limited to". The following description of the specification is a preferred embodiment for implementing the present application. however the description is for the purpose of illustrating the general principles of the application and is not intended to limit the scope of the application. The scope of protection of the application is subject to the definition of the appended claims.

In general, an integrated circuit (IC, for short) for driving a liquid crystal display device may satisfy driving of a liquid crystal antenna in terms of the number of signal outputs and the signal output speed. However, the range of the output voltage of the integrated circuit for driving the liquid crystal display device is narrow, for example, generally from −20V to 20V. The driving voltage of the liquid crystal antenna generally ranges from 20V to 40V. It is difficult and costly to develop an integrated circuit, which may outputs large voltages, for driving the liquid crystal antenna. In order to reduce the cost of developing a driving device for the liquid crystal antenna, in the present disclosure, the signal outputted by the integrated circuit for driving the liquid crystal display device has a characteristic of inversion, therefore, the integrated circuit for driving the liquid crystal display device may be used to drive the liquid crystal antenna.

It should be noted that, in the present disclosure, according to that the voltage signal outputted by the integrated circuit for driving the liquid crystal display device has characteristic of inversion or different polarities, the liquid crystal antenna is designed such that the integrated circuit for driving the liquid crystal display device may directly drive the liquid crystal antenna, thereby saving the cost of developing the driving circuit of the liquid crystal antenna.

The present disclosure provides a liquid crystal antenna. The liquid crystal antenna includes a first substrate and a second substrate disposed opposite to each other, a liquid crystal layer, a first electrode, a second electrode, and a control circuit. The liquid crystal layer is disposed between the first substrate and the second substrate. The first electrode is disposed on the first substrate and located on a side of the first substrate facing the liquid crystal layer. The second electrode is disposed on the second substrate and located a side of the second substrate facing the liquid crystal layer, and the second electrode is disposed opposite to the first electrode. The control circuit is configured to output a first voltage signal to the first electrode and output a second voltage signal to the second electrode. The first voltage signal is opposite in polarity to the second voltage signal. In this case, an integrated circuit that outputs a low voltage may drive a liquid crystal antenna that requires high voltage driving, thereby reducing the cost of developing the driving circuit of the liquid crystal antenna.

It should be emphasized that the control circuit in the present disclosure may be an integrated circuit for driving a liquid crystal display device, or other integrated circuit, and the control circuit may synchronously output two voltage signals with opposite polarities. The two voltage signals with opposite polarities in the present disclosure mean that a magnitude relationship between one voltage signal and a reference voltage signal is opposite to a magnitude relationship between the other voltage signal and the reference voltage signal. For example, a value of one voltage signal is greater than that of the reference voltage, and a value of the other voltage signal is less than that of the reference voltage, in this case, the magnitude relationship between one voltage signal and the reference voltage signal is opposite to the magnitude relationship between the other voltage signal and the reference voltage signal. The reference voltage may be 0, or any value greater than 0, or any value less than 0. The two voltage signals with opposite polarity in the present disclosure are respectively, for example, a positive voltage signal and a negative voltage signal at the same time.

Figure 1B:
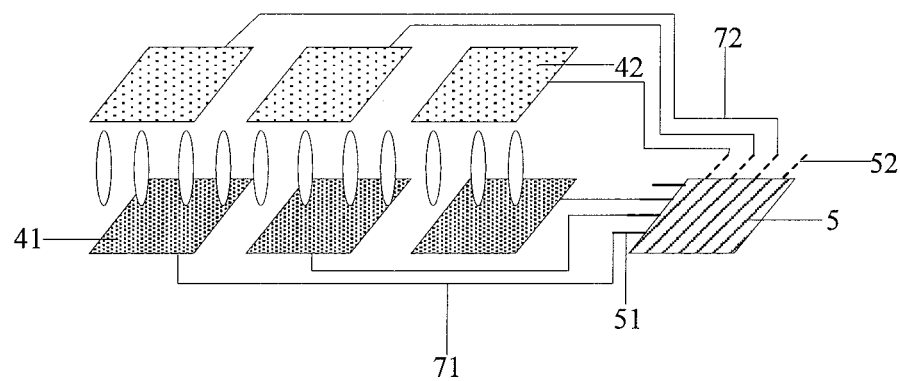
FIG. 1B is a schematic diagram showing a driving principle of a liquid crystal antenna according to some embodiments of the present disclosure.

FIG. 1A is a schematic cross-sectional view of a liquid crystal antenna according to some embodiments of the present disclosure. FIG. 1B is a schematic diagram showing a driving principle of a liquid crystal antenna according to some embodiments of the present disclosure. Referring to FIG. 1A and FIG. 1B, a liquid crystal antenna according to some embodiments of the present disclosure includes: a first substrate 1 and a second substrate 2 disposed opposite to each other; a liquid crystal layer 3 disposed between the first substrate 1 and the second substrate 2; and antenna units 4 arranged in an array and disposed between the first substrate 1 and the second substrate 2. Each of the antenna units 4 includes a first electrode 41 disposed on a side of the first substrate 1 adjacent to the liquid crystal layer 3 and a second electrode 42 disposed on a side of the second substrate 2 adjacent to the liquid crystal layer 3. The liquid crystal antenna further includes a control circuit 5, for example, an integrated circuit, as shown in FIG. 1B, the control circuit 5 includes a first output terminal 51 and a second output terminal 52. The control circuit 5 outputs voltage signals with opposite polarities (i.e., a first voltage signal V1 and a second voltage signal V2) through the first output terminal 51 and the second output terminal 52, respectively, in the same frame. The first electrode 41 is electrically connected to the first output terminal 51 to receive the first voltage signal V1, and the second electrode 42 is electrically connected to the second output terminal 52 to receive the second voltage signal V2. The first voltage signal V1 is opposite in polarity to the second voltage signal V2. FIG. 1B simply illustrates a connection relationship of the control circuit 5, the first electrode 41, and the second electrode 42.

It should be noted that the liquid crystal antenna further includes a sealant for sealing the liquid crystal layer. As shown in FIG. 1A, the sealant 12 is disposed between the first substrate 1 and the second substrate 2, and the control circuit 5 is disposed on a side of the sealant 12 away from the liquid crystal layer, that is, the control circuit 5 is disposed at an edge region of the first substrate 1 or an edge region of the second substrate 2. In FIG. 1A, a scheme in which the control circuit 5 is provided at the edge region of the first substrate 1 is illustrated as an example. only the edge region of the first substrate 1 in which the control circuit 5 is disposed is illustrated as an example. In other embodiments, the control circuit 5 may also be disposed at the edge region of the second substrate 2.

Specifically, in the liquid crystal antenna according to some embodiments of the present disclosure, the control circuit includes a plurality of first output terminals 51 and a plurality of second output terminals 52, and the number of the first output terminals 51 and the number of the second output terminals 52 both are at least equal to the number of antenna units 4 in the liquid crystal antenna, such that each antenna unit 4 may receive the voltage signals with opposite polarities outputted by the first output terminal 51 and the second output terminal 52. In addition, since the control circuit 5 may be an integrated circuit that drives a liquid crystal display device, the number of the first output terminals 51 or the number of the second output terminal 52 in the control circuit may also be greater than the number of the antenna units 4, which is not specifically limited herein.

Figure 2:
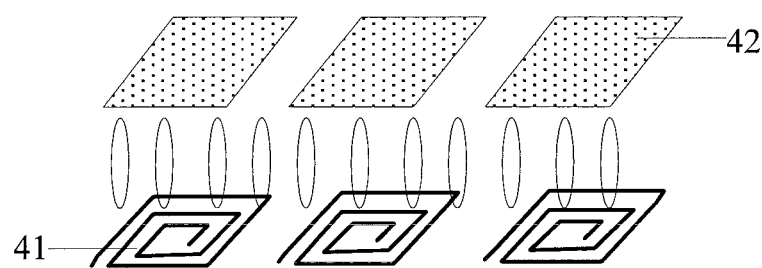
FIG. 2 is a schematic structural view of an antenna unit according to some embodiments of the present disclosure.

In some embodiments of the present disclosure, the first electrode and the second electrode may be rectangular, rhombic or any other shape, which is not specifically limited herein. Generally, the antenna unit includes a shield electrode facing a propagation direction of an electromagnetic wave and a phase shift line electrode facing away from the propagation direction of the electromagnetic wave. For example, in the present disclosure, the first electrode 41 may be a shield electrode, and the second electrode 42 is a phase shift line electrode, alternatively, the first electrode 41 is a phase shift line electrode, and the second electrode 42 is a shield electrode. For example, FIG. 2 is a schematic structural view of an antenna unit according to some embodiments of the present disclosure. As shown in FIG. 2, the second electrode 42 is a shield electrode of a block structure, and its orthographic projection on the first substrate 1 has a block shape. The first electrode 41 is a phase shift line electrode of a coil structure, and its orthographic projection on the first substrate 1 has a coil shape. As shown in FIGS. 1A and 2, the orthographic projection of the phase shift line electrode on the first substrate 1 falls within the orthographic projection of the shield electrode on the first substrate 1. The block structure shown in FIG. 2 is a quadrilateral, and it will be understood by those skilled in the art that the block structure may also have other shapes, such as a triangle, a circle, a hexagon, etc. The coil structure shown in FIG. 2 has a square coil structure, it will be understood by those skilled in the art that the coil structure may also has other shapes, such as a circular coil structure or the like.

Figure 3:
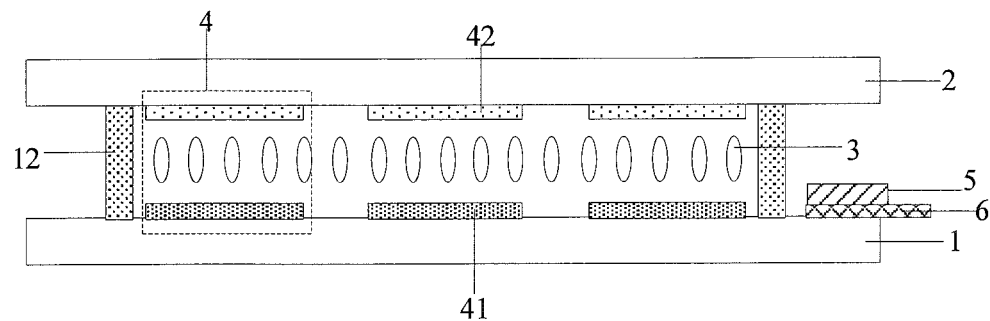
FIG. 3 is a schematic cross-sectional view of a liquid crystal antenna according to some embodiments of the present disclosure.

FIG. 3 is a schematic cross-sectional view of a liquid crystal antenna according to some embodiments of the present disclosure. In some specific embodiment, as shown in FIG. 3, the liquid crystal antenna according to some embodiments of the present disclosure may further include: a printed circuit board 6 which is fixedly connected to the first substrate 1 or the second substrate 2 by a connector or a bonding manner (FIG. 3 only shows that the printed circuit board 6 is connected to and fixed on the first substrate 1), and the control circuit 5 is disposed on the printed circuit board 6. Specifically, the printed circuit board 6 may be disposed on the first substrate 1 or the second substrate 2, and thus the control circuit 5 may be disposed on the first substrate 1 or the second substrate 2. When the printed circuit board 6 is fixedly connected to the first substrate 1 or the second substrate 2, it may be fixedly connected by a connector, or fixedly connected by a bonding manner, or may also be fixedly connected by a flexible printed circuit board (FPC, for short).

Figure 4A:
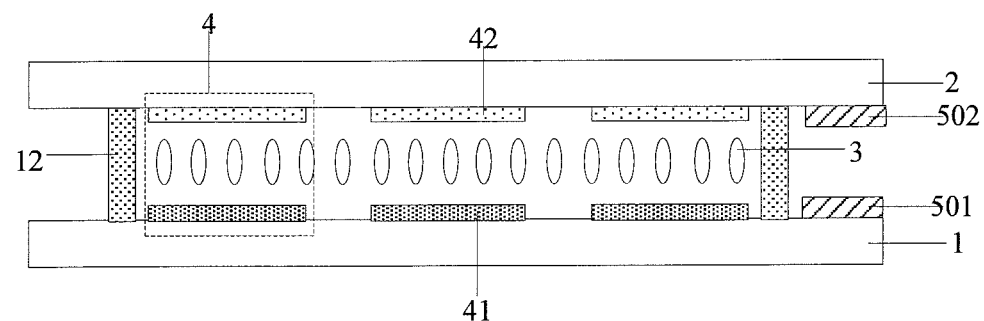
FIG. 4A is a schematic cross-sectional view of a liquid crystal antenna according to some embodiments of the present disclosure.
Figure 4B:
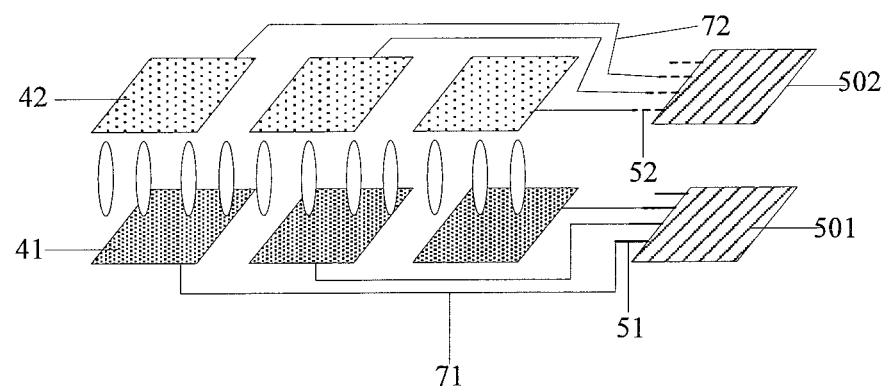
FIG. 4B is a schematic diagram showing a driving principle of a liquid crystal antenna according to some embodiments of the present disclosure.

FIG. 4A is a schematic cross sectional view of a liquid crystal antenna according to some embodiments of the present disclosure, and FIG. 4B is a schematic diagram showing a driving principle of a liquid crystal antenna according to some embodiments of the present disclosure. In some specific embodiments, in the liquid crystal antenna according to some embodiments of the present disclosure, as shown in FIG. 4A, the control circuit 5 may include a first integrated circuit 501 and a second integrated circuit 502. As shown in FIG. 4B, the first integrated circuit 501 includes a first output 51, and the second integrated circuit 502 includes a second output 52. Specifically, an output terminal of the first integrated circuit 501 acts as the first output terminal 51 which is configured to be electrically connected to the first electrode 41 to provide the first voltage signal V1 to the first electrode 41, and an output terminal of the second integrated circuit 502 acts as the second output terminal 52 which is configured to be electrically connected to the second electrode 42 to provide the second voltage signal V2 to the second electrode 42. The first voltage signal V1 is opposite in polarity to the second voltage signal V2.

In some embodiments, the first voltage signal V1 and the second voltage signal V2 need to be synchronously fed to the first electrode 41 and the second electrode 42, respectively, so as to form a driving voltage with a relatively great voltage value between the first electrode 41 and the second electrode 42. When the liquid crystal antenna includes two integrated circuits, in order to prevent the first voltage signal V1 outputted by the first integrated circuit 501 and the second voltage signal V2 outputted by the second integrated circuit 502 from being asynchronously transmitted to the first electrode 41 and the second electrode 42, so as to meet the driving requirements of the liquid crystal antenna, a timing controller (Tcon) may be added to the liquid crystal antenna, so that the first voltage signal V1 outputted by the first integrated circuit 501 and the second voltage signal V2 outputted by the second integrated circuit 502 may be synchronously fed to the first electrode 41 and the second electrode 42, respectively, under the control of the timing controller. The first voltage signal V1 outputted by the first integrated circuit 501 and the second voltage signal V2 outputted by the second integrated circuit 502 are opposite in polarity.

In a specific example, in the liquid crystal antenna according to some embodiments of the present disclosure, as shown in FIG. 4A, the first integrated circuit 501 is disposed on the first substrate 1, and the second integrated circuit 502 is disposed on the second substrate 2. Specifically, in order to facilitate an electrical connection between the first electrode 41 and the first output terminal 51 and an electrical connection between the second electrode 42 and the second output terminal 52, in the present disclosure, the first integrated circuit 501 is disposed on the first substrate 1 such that the first electrode 41 is directly electrically connected to the first output terminal 51 of the first integrated circuit 501, and the second integrated circuit 502 is disposed on the second substrate 2 such that the second electrode 42 is directly electrically connected to the second output terminal 52 of the second integrated circuit 502. In this way, it is not necessary to connect the first electrode 41 disposed on the first substrate 1 to an integrated circuit disposed on the second substrate 2 so as to avoid a connection defect, and it is not necessary to connect the second electrode 42 disposed on the second substrate 2 to an integrated circuit disposed on the first substrate 1 so as to avoid a connection defect.

It should be noted that the number of output terminals of the first integrated circuit 501 may be the same as or different from the number of output terminals of the second integrated circuit 502 in the present disclosure. The first integrated circuit and the second integrated circuit are only for distinguishing different integrated circuits, and the voltage signals outputted by the two integrated circuits are opposite in polarity at the same time. The first integrated circuit 501 is fixedly connected to an edge region of the first substrate 1, and the second integrated circuit 502 is fixedly connected to an edge region of the second substrate 2.

Specifically, the first integrated circuit is fixedly connected to the first substrate, and the second integrated circuit is fixedly connected to the second substrate by a connector, or by a bonding manner, or by a flexible printed circuit board. The first integrated circuit 501 and the second integrated circuit 502 are both fixed on a side of the sealant 12 away from the liquid crystal layer 3.

In a specific example, in the liquid crystal antenna according to some embodiments of the present disclosure, as shown in FIG. 1B and FIG. 4B, the liquid crystal antenna further includes: a first signal line 71 and a second signal line 72. The first electrode 41 is electrically connected to the first output terminal 51 via the first signal line 71, and the second electrode 42 is electrically connected to the second output terminal 52 via the second signal line 72. Specifically, as shown in FIG. 1B, the control circuit 5 of the liquid crystal antenna includes only one integrated circuit. When the control circuit 5 is disposed at the edge region of the first substrate 1, the first electrode 41 disposed on the first substrate 1 and the second electrodes 42 disposed on the second substrate 2 both need to be electrically connected to the control circuit 5 disposed on the first substrate 1. The first electrode 41 disposed on the first substrate 1 may be directly electrically connected to the first output terminal 51 of the control circuit 5 via the first signal line 71. When the second electrode 42 disposed on the second substrate 2 is electrically connected to the second output terminal 52 of the control circuit 5 via the second signal line 72, the second signal line 72 may be electrically connected to the second output terminal 52 of the control circuit 5 disposed on the first substrate 1 through the sealant 12 doped with conductive particles or in other manners, which are not specifically limited herein. As shown in FIG. 4B, the control circuit 5 of the liquid crystal antenna includes two integrated circuits, namely the first integrated circuit 501 and the second integrated circuit 502. The first integrated circuit 501 is disposed at an edge region of the first substrate 1, and the second integrated circuit 502 is disposed at an edge region of the second substrate 2. The first electrode 41 on the first substrate 1 is electrically connected to the first output terminal 51 of the first integrated circuit 501 on the first substrate 1 via the first signal line 71, and the second electrode 42 on the second substrate 2 is electrically connected to the second output terminal 52 of the second integrated circuit 502 on the second substrate 2 via the second signal line 72, thereby avoiding that at least one of the first voltage signal V1 and the second voltage signal V2 need to be introduced from one of the first substrate and the second substrate to the other of the first substrate and the second substrate.

In the present disclosure, the first signal line 71 and the second signal line 72 may be made of the same material as the electrode or made of other metal materials.

In a specific example, in the liquid crystal antenna according to some embodiments of the present disclosure, the first voltage signal and the second voltage signal outputted by the first output terminal and the second output terminal which are connected to the same antenna unit are equal in magnitude (the absolute values are the same), and are opposite in polarity. Specifically, the voltage signals with opposite polarities are respectively transmitted to the first electrode and the second electrode of the same antenna unit so as to drive the antenna unit. That is, in a single antenna unit, the first voltage signal V1 outputted by the first output terminal which is connected to the first electrode and the second voltage signal V2 outputted by the second output terminal which is connected to the second electrode are equal in magnitude and opposite in polarity.

For example, the first voltage signal is −5V, and the second voltage signal is 5V, so that the voltage which drives the antenna unit is 10V (5V−(−5V)), thereby a control circuit with a low voltage output may be used to drive a liquid crystal antenna that requires high voltage driving.

Optionally, the control circuit 5 shown in FIG. 1B is, for example, an integrated circuit for implementing a column inversion driving mode of a liquid crystal display device. When the liquid crystal display device is driven by the column inversion driving mode, in the integrated circuit for implementing the column inversion driving mode of the liquid crystal display device, two signal output terminals for outputting adjacent column data signals output two voltage signals, wherein, a magnitude relationship between one voltage signal and a reference voltage is opposite to a magnitude relationship between the other voltage signal and the reference voltage. The two voltage signals may be referred to as the first voltage signal and the second voltage signal. One of the first voltage signal and the second voltage signal is greater than the reference voltage, and the other is less than the reference voltage. The reference voltage may be set according to different types of liquid crystal display devices. Therefore, in some embodiments of the present disclosure, the output terminal which outputs the first voltage signal acts as the first output terminal which is electrically connected to the first electrode of the antenna unit, and the output terminal which outputs the second voltage signal acts as the second output terminal which is electrically connected to the second electrode of the antenna unit. Since the voltage signals in two adjacent columns of pixel units are opposite in polarity in the column inversion mode, that is, the voltage signals which are transmitted to the output terminals of the two adjacent columns of pixel units are opposite in polarity, in some embodiments of the present disclosure, the voltage signals which are transmitted to the two adjacent columns of pixel units are respectively transmitted to the first electrode and the second electrode of the same antenna unit. Therefore, the integrated circuit which drives the liquid crystal display device may directly drive the liquid crystal antenna, thereby saving the cost of developing the driving circuit of the liquid crystal antenna.

Optionally, the control circuit 5 shown in FIG. 1B is, for example, an integrated circuit for implementing a row inversion driving mode of a liquid crystal display device. When the liquid crystal display device is driven by the row inversion driving mode, in the integrated circuit for implementing the row inversion driving mode of the liquid crystal display device, two signal output terminals for outputting adjacent row data signals output two voltage signals, wherein, a magnitude relationship between one voltage signal and a reference voltage is opposite to a magnitude relationship between the other voltage signal and the reference voltage. The two voltage signals may be referred to as the first voltage signal and the second voltage signal. One of the first voltage signal and the second voltage signal is greater than the reference voltage, and the other is less than the reference voltage. The reference voltage may be set according to different types of liquid crystal display devices. Therefore, in some embodiments of the present disclosure, the output terminal which outputs the first voltage signal acts as the first output terminal which is electrically connected to the first electrode of the antenna unit, and the output terminal which outputs the second voltage signal acts as the second output terminal which is electrically connected to the second electrode of the antenna unit. Since the voltage signals in two adjacent rows of pixel units are opposite in polarity in the row inversion mode, that is, the voltage signals which are transmitted to the output terminals of the two adjacent rows of pixel units are opposite in polarity, in some embodiments of the present disclosure, the voltage signals which are transmitted to the two adjacent rows of pixel units are respectively transmitted to the first electrode and the second electrode of the same antenna unit. Therefore, the integrated circuit which drives the liquid crystal display device may directly drive the liquid crystal antenna, thereby saving the cost of developing the driving circuit of the liquid crystal antenna.

Optionally, the control circuit 5 shown in FIG. 1B is, for example, an integrated circuit for implementing a dot inversion driving mode of a liquid crystal display device, and the first electrode and the second electrode of the antenna unit in the liquid crystal antenna may still be driven in the similar manner as described above, which will not be repeated herein.

Optionally, the first driving circuit 501 shown in FIG. 4B is, for example, one of the integrated circuit for implementing the column inversion driving mode of the liquid crystal display device, the integrated circuit for implementing the row inversion driving mode of the liquid crystal display device, and the integrated circuit for implementing the dot inversion driving mode of the liquid crystal display device, and the second driving circuit 502 is, for example, one of the integrated circuit for implementing the column inversion driving mode of the liquid crystal display device, the integrated circuit for implementing the row inversion driving mode of the liquid crystal display device, and the integrated circuit for implementing the dot inversion driving mode of the liquid crystal display device, as long as the first voltage signal outputted by the first driving circuit 501 and the second voltage signal outputted by the second driving circuit 502 are opposite in polarity. The two voltage signals are respectively transmitted to the first electrode and the second electrode of the antenna unit in the liquid crystal antenna. In some embodiments, an timing control circuit is required to synchronously output the first voltage signal outputted by the first driving circuit 501 and the second voltage signal outputted by the second driving circuit 502, so that the first electrode and the second electrode of the antenna unit simultaneously receive the first voltage signal and the second voltage signal. Thereby, the integrated circuit which drives the liquid crystal display device may directly drive the liquid crystal antenna, thereby saving the cost of developing the driving circuit of the liquid crystal antenna.

In a specific example, in the above liquid crystal antenna according to some embodiments of the present disclosure, for the same antenna unit, the first voltage signal outputted by the first output terminal in one of two adjacent frames is opposite in polarity to that in the other of the two adjacent frames, and the second output signal outputted by the second output terminal in one of two adjacent frames is opposite in polarity to that in the other of the two adjacent frames. Specifically, when driving the liquid crystal display device, the voltage signal inputted into the same pixel in one of two adjacent frames is opposite in polarity to that in the other of the two adjacent frames. Therefore, in the present disclosure, the liquid crystal antenna is driven according to the characteristics of the control circuit that the voltage signal, which is outputted by the control circuit for the same antenna unit, in one of two adjacent frames is opposite in polarity to that in the other of the two adjacent frames. For example, in a first frame, the first voltage signal outputted by the first output terminal of the control circuit is −5V, and the second voltage outputted by the second output terminal is 5V; in a second frame, the first voltage signal outputted by the first output terminal of the control circuit is 5V, and the second voltage signal outputted by the second output terminal is −5V.

Figure 5:
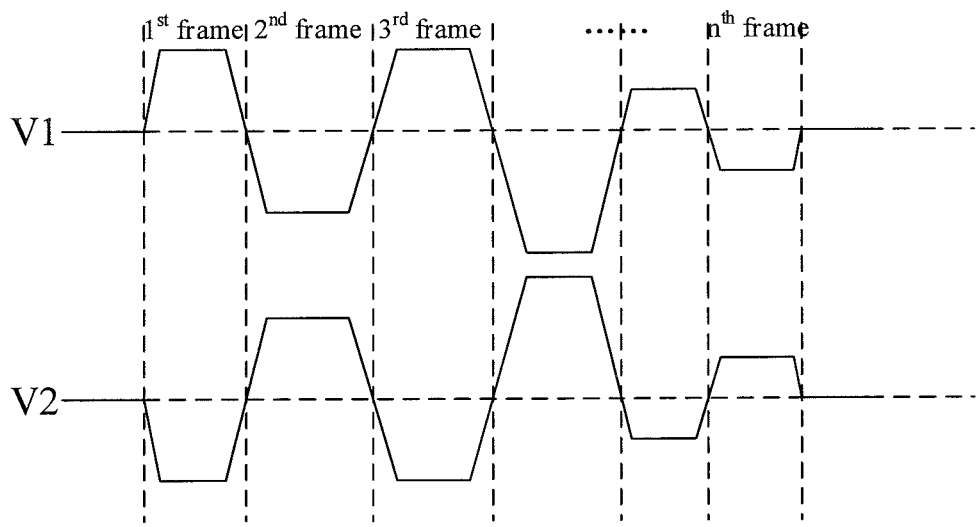
FIG. 5 is a waveform diagram of a first voltage signal and a second voltage signal according to some embodiments of the present disclosure.

FIG. 5 is a waveform diagram of a first voltage signal and a second voltage signal according to some embodiments of the present disclosure. As shown in FIG. 5, at any moment, the first voltage signal V1 and the second voltage signal V2 are opposite in polarity. In two adjacent frames, the first voltage signal V1 in one frame is opposite in polarity to that in the other frame, and the second voltage signal V2 in one frame is opposite in polarity to that in the other frame.

It should be noted that when the control circuit of the liquid crystal antenna includes one integrated circuit, an output curve of the first voltage signal and an output curve of the second voltage signal may be symmetrical to each other; when the control circuit of the liquid crystal antenna includes two integrated circuits, an output curve of the first voltage signal outputted by the first integrated circuit and an output curve of the second voltage signal outputted by the second integrated circuit may be symmetrical to each other.

Based on the same inventive concept, some embodiments of the present disclosure further provide a communication device including any of the above liquid crystal antennas according to the embodiments of the present disclosure. The communication device in the present disclosure may be any device having a communication function. Since the cost of developing the liquid crystal antenna in the present disclosure is reduced, the cost of developing the communication device in the present disclosure is also reduced.

Figure 6:
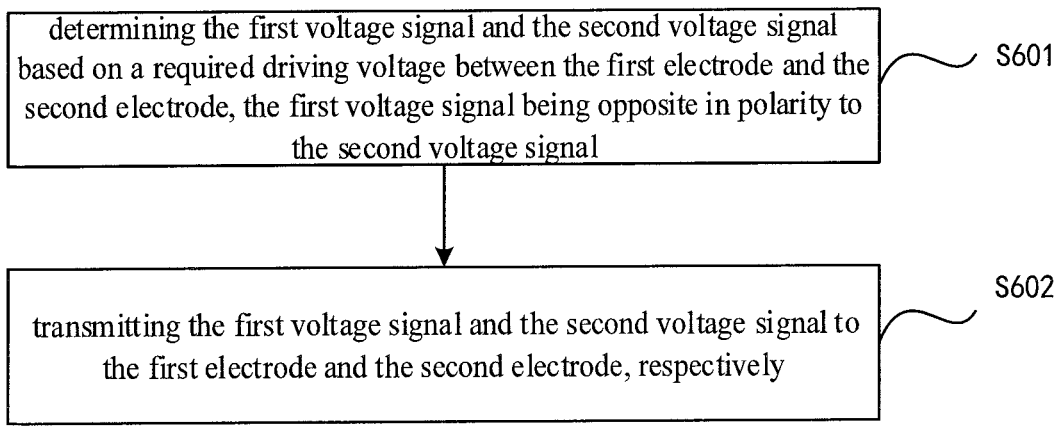
FIG. 6 is a flowchart of a method of driving a liquid crystal antenna according to some embodiments of the present disclosure.

FIG. 6 is a flowchart of a method of driving a liquid crystal antenna according to some embodiments of the present disclosure. Based on the same inventive concept, some embodiments of the present disclosure further provide a method of driving a liquid crystal antenna for driving the foregoing liquid crystal antenna. Referring to FIG. 6, the method includes:

S601, determining the first voltage signal and the second voltage signal based on a required driving voltage between the first electrode and the second electrode, the first voltage signal being opposite in polarity to the second voltage signal; and S602, transmitting the first voltage signal and the second voltage signal to the first electrode and the second electrode, respectively.

Specifically, before determining the first voltage signal and the second voltage signal, the first output terminal and the second output terminal are determined according to both a connection relationship between the control circuit and the first electrode and a connection relationship between the control circuit and the second electrode. For example, an output terminal connected to the first electrode is used as the first output terminal, and an output terminal connected to the second electrode is used as the second output terminal.

In step S601, it is determined that each of an absolute value of the first voltage signal and an absolute value of the second voltage signal is equal to a half of an absolute value of a required driving voltage.

Specifically, in some embodiments of the present disclosure, the first voltage signal and the second voltage signal may be two voltage signals, wherein a magnitude relationship between one of the two voltage signals and a reference voltage signal is opposite to a magnitude relationship between the other one and the reference voltage signal.

When determining the values of the first voltage signal and the second voltage signal, the determination may be made according to the required driving voltage of the antenna unit. For example, when the required driving voltage of the antenna unit is A, the first voltage signal with the value of A/2 may be outputted by the first output terminal, and the second voltage signal with the value of −A/2 may be outputted by the second output terminal; alternatively, the first voltage signal with the value of −A/2 may be outputted by the first output terminal, and the second voltage signal with the value of A/2 may be outputted by the second output terminal, thereby driving the antenna unit with the driving voltage having the value of A.

It should be noted that the voltage signal outputted by the control circuit for driving the liquid crystal antenna may be adjusted according to driving requirements of the antenna unit. In order to further facilitate the control circuit to output a corresponding voltage signal according to the driving requirements of the antenna unit, a correspondence relationship between the required driving voltage of the antenna unit and the output voltage of the control circuit may be prestored, thereby directly determining the first voltage signal and second voltage signal to be outputted according to the correspondence relationship.

Since the voltage which drives the antenna unit is a voltage difference applied between the first electrode and the second electrode, if the control circuit includes the first integrated circuit and the second integrated circuit, and the output voltage ranges of two integrated circuits are different, the voltage range generated by combination of the voltage signals outputted by the first integrated circuit and the second integrated circuit may exceeds the voltage range set by any of the two integrated circuits.

In some embodiments, when the control circuit is an integrated circuit (IC, for short) that supplies 8-bit data to the pixel unit, voltage control accuracy of 10 bits or more may be achieved. Wherein, when the IC outputs the first voltage signal and the second voltage signal respectively through the first output terminal and the second output terminal, each of the first voltage signal and the second voltage signal is determined according to a required voltage of each antenna unit. For example, by calculating the voltage required for each gray level of the 10-bit data, the voltage that should be outputted at each gray level of the 8-bit data is obtained. The IC converts the output voltage into the first voltage signal and the second voltage signal which need to be respectively outputted by the first output terminal and the second output terminal. Thereby, the purpose of driving the antenna unit is achieved.

In some embodiments, the voltage values required for n antenna units in each group of antenna units are $a_1, a_2, \ldots, a_{n-1}, a_n$ respectively, wherein, $a_i$ is the voltage value required for the $i^{th}$ antenna unit. The IC will calculate the voltage value that needs to be output at each output terminal according to the voltage value required for each antenna unit. The calculate voltage values are $a'_{1,1}, a'_{1,2}, a'_{2,1}, a'_{2,2} \ldots a'_{n-1,1}, a'_{n-1,2}, a'_{n,1}, a'_{n,2}$ respectively, wherein, $a'_{i,1}$ is the first voltage signal (i.e., the voltage signal outputted by the first output terminal) which is inputted to the first electrode of the $i^{th}$ antenna unit, $a'_{i,2}$ is the second voltage (i.e., the voltage signal outputted by the second output terminal) which is inputted to the second electrode of the $i^{th}$ antenna unit, wherein i is a natural number, and $1 \leq i \leq n$.

It should be noted that, the correspondence relationship between the voltage value that drives the antenna unit and the voltage signal outputted by the output terminal may be pre-stored in the control circuit, and may be stored in a table or stored in other forms for convenient searching.

In a specific example, in the above driving method according to the embodiments of the present disclosure, the method further includes: determining the first voltage signal outputted by the first output terminal which has opposite polarities in two adjacent frames and the second voltage signal outputted by the second output terminal which has opposite polarities in two adjacent frames. Specifically, in the same frame, the first voltage signal and the second voltage signal are opposite in polarity, and are equal or different in magnitude; in two adjacent frames, the first voltage signal in one frame and the first voltage signal in the other frame are opposite in polarity, and are equal or different in magnitude, and the second voltage signal in one frame and the second voltage signal in the other frame are opposite in polarity, and are equal or different in magnitude. The magnitudes of the first voltage signal and the second voltage signal may be determined according to the pre-stored correspondence relationship between the voltage value that drives antenna unit and the voltage signal outputted by the output terminal.

In summary, in some embodiments of the present disclosure, the control circuit respectively outputs voltage signals with opposite polarities in the same frame to drive the liquid crystal antenna, that is, the voltage signal outputted to the first electrode by the first output terminal is opposite in polarity to the voltage signal outputted to the second electrode by the second output terminal, so that the voltage difference between the first electrode and the second electrode driving the liquid crystal antenna is increased, and the control circuit that outputs the low voltage is used to drive the liquid crystal antenna that requires high voltage driving.

It will be apparent to those skilled in the art that various changes and modifications may be made in the present disclosure without departing from the spirit and scope of the disclosure. If such modifications and variations of the present disclosure are within the scope of the appended claims and their equivalents, the disclosure is also intended to cover such modifications and variations.

What is claimed is:
1. A liquid crystal antenna comprising:
   a first substrate and a second substrate opposite to each other;
   a liquid crystal layer between the first substrate and the second substrate;
   a first electrode on the first substrate and on a side of the first substrate facing the liquid crystal layer;
   a second electrode on the second substrate and on a side of the second substrate facing the liquid crystal layer, the second electrode being opposite to the first electrode; and
   a control circuit configured to output a first voltage signal to the first electrode and output a second voltage signal to the second electrode, wherein the control circuit comprises an integrated circuit which is configured to implement a column inversion driving mode of a liquid crystal display device, the first voltage signal and the second voltage signal are respectively outputted by a first signal output terminal and a second signal output terminal of the integrated circuit, the first signal output terminal and the second signal output terminal being configured to output adjacent column data signal,
   wherein the first voltage signal is opposite in polarity to the second voltage signal.

2. The liquid crystal antenna according to claim 1, wherein the first electrode and the second electrode synchronously receive the first voltage signal and the second voltage signal, respectively.

3. The liquid crystal antenna according to claim 2, wherein the integrated circuit comprises a first integrated circuit and a second integrated circuit, each of which is configured to drive the liquid crystal display device.

4. The liquid crystal antenna according to claim 3, wherein the first voltage signal is outputted by a first signal output terminal of the first integrated circuit, and the second voltage signal is outputted by a second signal output terminal of the second integrated circuit.

5. The liquid crystal antenna according to claim 4, further comprising:
   a timing controller configured to enable the first signal output terminal of the first integrated circuit and the second signal output terminal of the second integrated circuit to synchronously output the first voltage signal and the second voltage signal, respectively.

6. The liquid crystal antenna according to claim 1, wherein an absolute value of the first voltage signal is equal to an absolute value of the second voltage signal.

7. The liquid crystal antenna according to claim 1, wherein an orthographic projection of the first electrode on the first substrate has a coil shape, and an orthographic projection of the second electrode on the first substrate has a block shape.

8. The liquid crystal antenna according to claim 7, wherein the orthographic projection of the first electrode on the first substrate falls within the orthographic projection of the second electrode on the first substrate.

9. The liquid crystal antenna according to claim 1, wherein the first electrode and the second electrode constitute an antenna unit, and the liquid crystal antenna comprises a plurality of antenna units arranged in an array.

10. The liquid crystal antenna according to claim 1, wherein the first voltage signal outputted in one of two adjacent frames is opposite in polarity to the first voltage signal outputted in the other of the two adjacent frames, and the second voltage signals outputted in the one of the two adjacent frames is opposite in polarity to the second voltage signals outputted in the other of the two adjacent frames.

11. The liquid crystal antenna according to claim 1, wherein the control circuit is located at an edge region of the first substrate or an edge region of the second substrate.

12. The liquid crystal antenna according to claim 1, further comprising a printed circuit board connected to the first substrate or the second substrate, wherein the control circuit is disposed on the printed circuit board.

13. The liquid crystal antenna according to claim 3, wherein the first integrated circuit is located at an edge region of the first substrate, and the second integrated circuit is located at an edge region of the second substrate.

14. The liquid crystal antenna according to claim 1, further comprising:
   a first signal line, through which the first electrode receives the first electrode signal; and
   a second signal line, through which the second electrode receives the second electrode signal.

15. A communication device comprising the liquid crystal antenna according to claim 1.

16. A method of driving a liquid crystal antenna, the liquid crystal antenna comprising:
   a first substrate and a second substrate opposite to each other;

a liquid crystal layer between the first substrate and the second substrate;

a first electrode on the first substrate and on a side of the first substrate facing the liquid crystal layer;

a second electrode on the second substrate and on a side of the second substrate facing the liquid crystal layer, the second electrode being opposite to the first electrode; and a control circuit configured to output a first voltage signal to the first electrode and output a second voltage signal to the second electrode, wherein the control circuit comprises an integrated circuit which is configured to implement a column inversion driving mode of a liquid crystal display device, the first voltage signal and the second voltage signal are respectively outputted by a first signal output terminal and a second signal output terminal of the integrated circuit, the first signal output terminal and the second signal output terminal being configured to output adjacent column data signal, wherein the method comprises:

determining the first voltage signal and the second voltage signal based on a required driving voltage between the first electrode and the second electrode, the first voltage signal being opposite in polarity to the second voltage signal; and transmitting the first voltage signal and the second voltage signal to the first electrode and the second electrode, respectively.

17. The method according to claim 16, wherein, determining the first voltage signal and the second voltage signal based on the required driving voltage between the first electrode and the second electrode comprises: determining that each of an absolute value of the first voltage signal and an absolute value of the second voltage signal is equal to a half of an absolute value of the required driving voltage.

18. The driving method according to claim 16, wherein the first voltage signal and the second voltage signal are synchronously outputted.

* * * * *